Patented Mar. 28, 1950

2,502,174

UNITED STATES PATENT OFFICE 2,502,174

ALKYLATING PYRIDINE RING COMPOUNDS

William H. Rieger, Indianapolis, Ind., assignor to Reilly Tar & Chemical Corporation, Indianapolis, Ind., a corporation of Indiana No Drawing. Application May 19, 1947, Serial No. 749,099

11 Claims. (Cl. 260—283)

My invention relates to a process of alkylating pyridine-ring-containing compounds.

I have found that pyridine-ring-containing compounds such as pyridine or quinoline, either unsubstituted or containing alkyl substituents, may be alkylated efficiently by the use of a tetravalent lead salt of an aliphatic organic acid. By my process alkyl groups containing one less carbon atom than the organic acid radical of the lead salt used are introduced into the nitrogen-containing ring of the pyridine-ring compound; the entering alkyl group occupies the 2- and 4-position if those positions are open; if one of those positions is blocked by an already present group the entering alkyl group occupies the other of those positions.

In a preferred method of carrying out my invention I dissolve the pyridine or quinoline compound in an organic acid, heat the solution to about 80° C.–120° C., and then add, in small portions, the tetravalent lead salt of the organic acid in which the pyridine or quinoline is dissolved. After all of the lead salt has been added the mixture is maintained at the reaction temperature for about one to two hours longer. The bases in the reaction mixture are recovered in any suitable manner.

In some cases I find it more convenient to carry out the alkylation and the preparation of the tetravalent lead salt in one step. In order to accomplish this I add red lead in small portions to the heated solution of the pyridine base in the organic acid. In this manner the tetravalent lead salt is formed and the alkylation proceeds in one step.

In order to initiate the alkylation reaction I find it advantageous to use a promoter, i. e. a catalyst, although this is not necessary; if the reaction does not start promptly the addition of a promoter is advisable. The promoter is used in catalytic amounts and is an organic compound containing an active hydrogen; examples of suitable promoters are the low molecular weight aliphatic alcohols, such as methyl alcohol, ethyl alcohol, isopropyl alcohol, and the like, ethyl malonate, ethyl acetoacetate, etc.

As specific examples of my invention I cite the following:

Example 1

To a well agitated solution of 79 grams of pyridine in 300 cc. of glacial acetic acid and 2 cc. of methyl alcohol, maintained at a temperature of 80–110° C., there is added in small portions 443 grams of lead tetra-acetate; the addition of the lead tetra-acetate requires about one hour. After all the lead salt has been added the reaction mixture is maintained at the reaction temperature and is agitated for about one or two hours longer. Then, after cooling, the reaction mixture is made basic with a caustic soda solution and the resulting mixture is distilled. The distillate comprises water and pyridine bases. The pyridine bases are separated from the water by the addition of strong caustic soda (50% or higher); by such an addition two layers are formed and the pyridine bases are separated from the caustic soda solution by decantation. The bases thus recovered comprise unchanged pyridine, 2-picoline, and 4-picoline.

Example 2

The procedure outlined in Example 1 is repeated except that 93 g. of 2-picoline is used instead of the pyridine. The mixture of bases obtained comprises 2-picoline, 2,4-lutidine and 2,6-lutidine.

Example 3

The procedure of Example 1 is repeated except that a molecular equivalent quantity of 3-picoline is used instead of the pyridine. The mixture of bases obtained comprises 2,3-lutidine and 2,5-lutidine along with some unchanged 3-picoline.

Example 4

The procedure of Example 1 is repeated except that a molecular equivalent quantity of 4-picoline is used instead of the pyridine. The mixture of bases obtained comprises 2,4-lutidine and unchanged 4-picoline.

Example 5

The procedure of Example 1 is repeated except that a molecular equivalent quantity of 2,6-lutidine is used instead of the pyridine. The mixture of bases obtained comprises 2,4,6-collidine and unchanged 2,6-lutidine.

Example 6

The procedure of Example 1 is repeated except that a molecular equivalent quantity of propionic acid is substituted for the acetic acid and a molecular equivalent quantity of lead tetra-propionate is used instead of lead tetra-acetate. The pyridine bases obtained comprise 2-ethylpyridine, 4-ethylpyridine and unchanged pyridine.

Example 7

The procedure of Example 1 is repeated except that a molecular equivalent quantity of quinoline is substituted for the pyridine. The mixture of bases obtained comprises quinaldine, lepidine and unchanged quinoline.

Example 8

The procedure of Example 1 is repeated except that a molecular equivalent quantity of isoquinoline is substituted for the pyridine. The mixture of bases obtained comprises 1-methylisoquinoline and unchanged isoquinoline.

Example 9

To a continuously agitated solution of 79 g. of pyridine in 600 cc. of glacial acetic acid heated to 80–110° C., and maintained at this temperature, there is added, in small portions, 685 g. of red lead; the addition requires about one hour. After all the red lead has been added the reaction mixture is maintained at 80–110° C. and is agitated for about 2 hours. The pyridine bases are recovered from the reaction mixture as by the procedure described in Example 1. The mixture of bases obtained comprises 2-picoline, 4-picoline and unchanged pyridine.

Example 10

To a continuously agitated solution of 279 g. of 4-picoline dissolved in 1800 g. of propionic acid and 6 cc. of methanol maintained at a temperature of 110–120° C., there is added, in small portions, 2055 g. of red lead. After all of the red lead has been added the reaction mixture is maintained at the reaction temperature for about 2 to 4 hours longer. The bases are then recovered from the reaction mixture in any suitable manner, such as by the procedure outlined in Example 1. The pyridine compounds recovered comprise 2-ethyl-4-methylpyridine and unchanged 4-picoline.

I claim as my invention:

1. The process of alkylating pyridine which comprises heating it with a mixture of an aliphatic organic acid of the class consisting of acetic acid and propionic acid, the tetravalent lead salt of said aliphatic organic acid, and a catalyst of the class consisting of methanol and ethanol, and recovering the thus formed alkylated pyridine.

2. The process of alkylating quinoline which comprises heating it with a mixture of an aliphatic organic acid of the class consisting of acetic acid and propionic acid, the tetravalent lead salt of said aliphatic organic acid, and a catalyst of the class consisting of methanol and ethanol, and recovering the thus formed alkylated quinoline.

3. The process of claim 1 in which the aliphatic organic acid is acetic acid.

4. The process of claim 2 in which the aliphatic organic acid is acetic acid.

5. The process of claim 1 in which the aliphatic organic acid is propionic acid.

6. The process of claim 2 in which the aliphatic organic acid is propionic acid.

7. The process of alkylating pyridine-ring-containing compounds, which apart from the pyridine nitrogen are entirely hydrocarbon, which comprises heating the pyridine-ring-containing compound with a mixture of an aliphatic organic acid of the class consisting of acetic acid and propionic acid and the tetravalent lead salt of said aliphatic organic acid, and recovering the thus formed alkylated pyridine-ring-containing compound.

8. The process of alkylating pyridine-ring-containing compounds, which apart from the pyridine nitrogen are entirely hydrocarbon, which comprises heating the pyridine-ring-containing compound with a mixture of an aliphatic organic acid of the class consisting of acetic acid and propionic acid, the tetravalent lead salt of said aliphatic organic acid, and a catalyst, and recovering the thus formed alkylated pyridine-ring-containing compound.

9. The process of claim 8 in which the catalyst is a member of the class consisting of methanol and ethanol.

10. The process of claim 7 in which the pyridine-ring-containing compound is quinoline.

11. The process of claim 7 in which the pyridine-ring-containing compound is pyridine.

WILLIAM H. RIEGER.

No references cited.